(12) United States Patent
Atkinson et al.

(10) Patent No.: US 11,216,545 B2
(45) Date of Patent: Jan. 4, 2022

(54) AUTHENTICATING AND AUTHORIZING USERS REGARDING PHYSICAL GOODS

(71) Applicants: Paul Atkinson, Poway, CA (US); Jack Donner, San Diego, CA (US)

(72) Inventors: Paul Atkinson, Poway, CA (US); Jack Donner, San Diego, CA (US)

( * ) Notice: Subject to any disclaimer, the term of this patent is extended or adjusted under 35 U.S.C. 154(b) by 5 days.

(21) Appl. No.: 16/575,156

(22) Filed: Sep. 18, 2019

(65) Prior Publication Data

US 2021/0081517 A1    Mar. 18, 2021

Related U.S. Application Data

(60) Provisional application No. 62/732,660, filed on Sep. 18, 2018.

(51) Int. Cl.

| | |
|---|---|
| *G06F 21/32* | (2013.01) |
| *H04L 9/32* | (2006.01) |
| *G06K 9/00* | (2006.01) |
| *G06F 3/16* | (2006.01) |
| *G06F 3/01* | (2006.01) |
| *G10L 17/24* | (2013.01) |

(52) U.S. Cl.
CPC ............... *G06F 21/32* (2013.01); *G06F 3/016* (2013.01); *G06F 3/167* (2013.01); *G06K 9/00926* (2013.01); *G10L 17/24* (2013.01); *H04L 9/3231* (2013.01)

(58) Field of Classification Search
CPC .......... G06F 21/32; G06F 3/167; G06F 3/016; H04L 9/3231; H04L 2209/805; H04L 9/3226; G06K 9/00926; G10L 17/24
See application file for complete search history.

(56) References Cited

U.S. PATENT DOCUMENTS

| | | | |
|---|---|---|---|
| 2012/0245941 A1* | 9/2012 | Cheyer | ............. H04L 63/10 704/246 |
| 2016/0354283 A1* | 12/2016 | Cho | ..................... A61J 7/00 |
| 2018/0280243 A1* | 10/2018 | Velani | ................ A61J 7/0472 |

* cited by examiner

*Primary Examiner* — Toan N Pham

(57) ABSTRACT

Briefly, a portable intelligent device is provided that has an audio input for receiving a voice input from a user and an event manager for detecting that an event has occurred. The intelligent device also stores a passcode and a voice-code indicative of the passcode that is unique to a particular user. The intelligent device presents the passcode to a user, for example, from a display on the device, or from smart phone or tablet wirelessly connected to the intelligent device. The user speaks the passcode into an input transducer (microphone) on the intelligent device, and a processor generates a voiceprint that reflects the spoken passcode. The processor then can use the stored voice-code and the generated voiceprint to determine if a specific user was speaking, and if the user spoke the correct passcode. In this way the intelligent device is able to authenticate or authorize a remote user simply by having the user anonymously speak a passcode into the intelligent device.

43 Claims, 10 Drawing Sheets

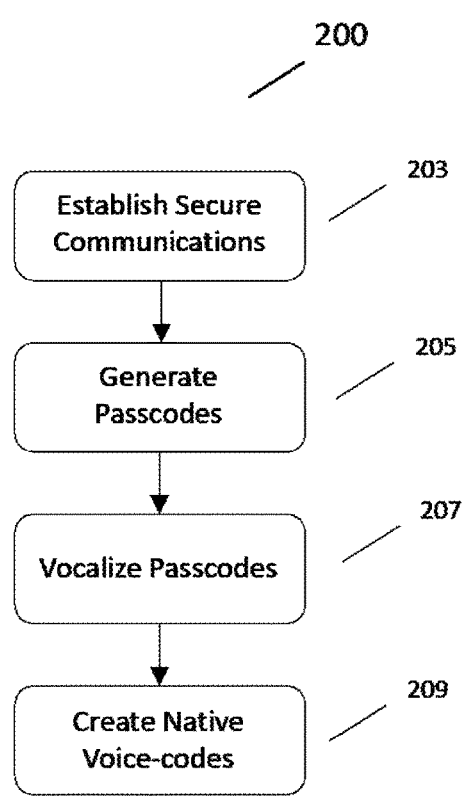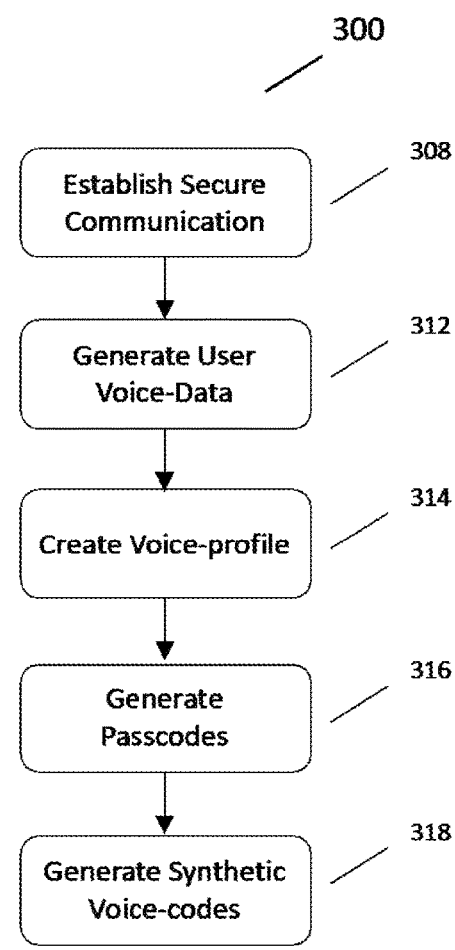
Fig. 2
Fig. 3

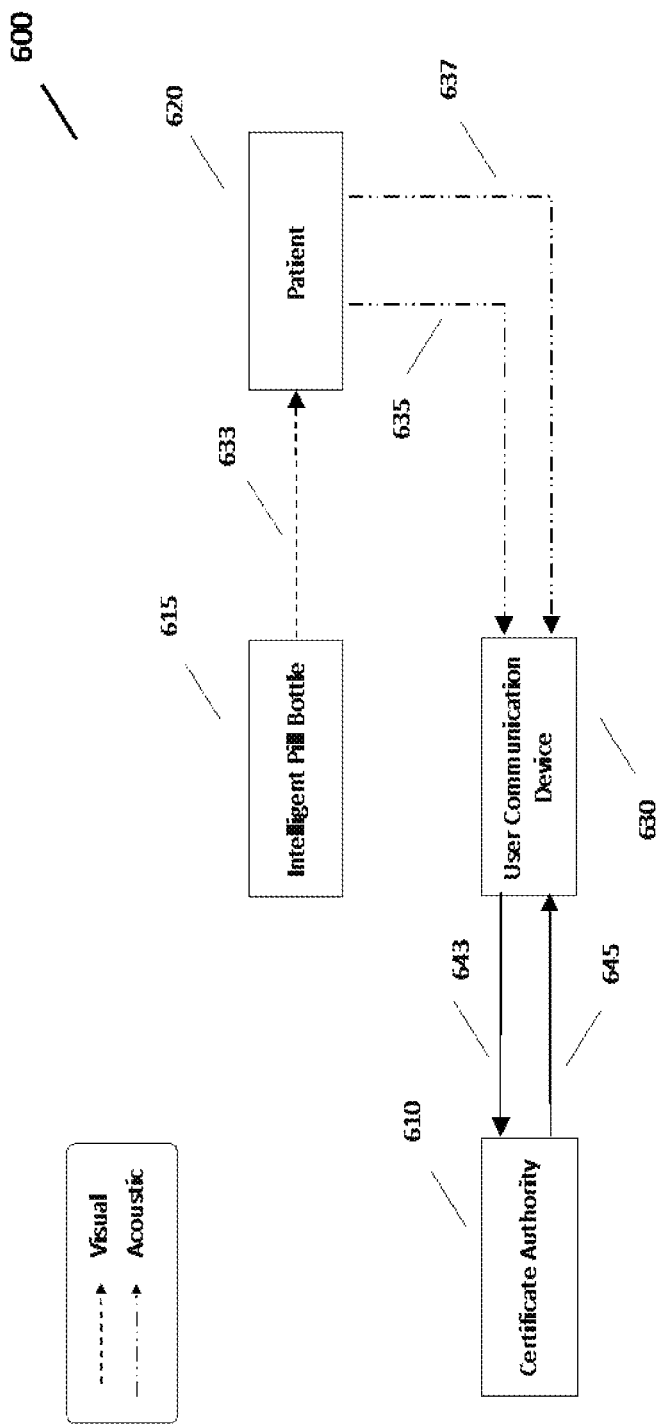

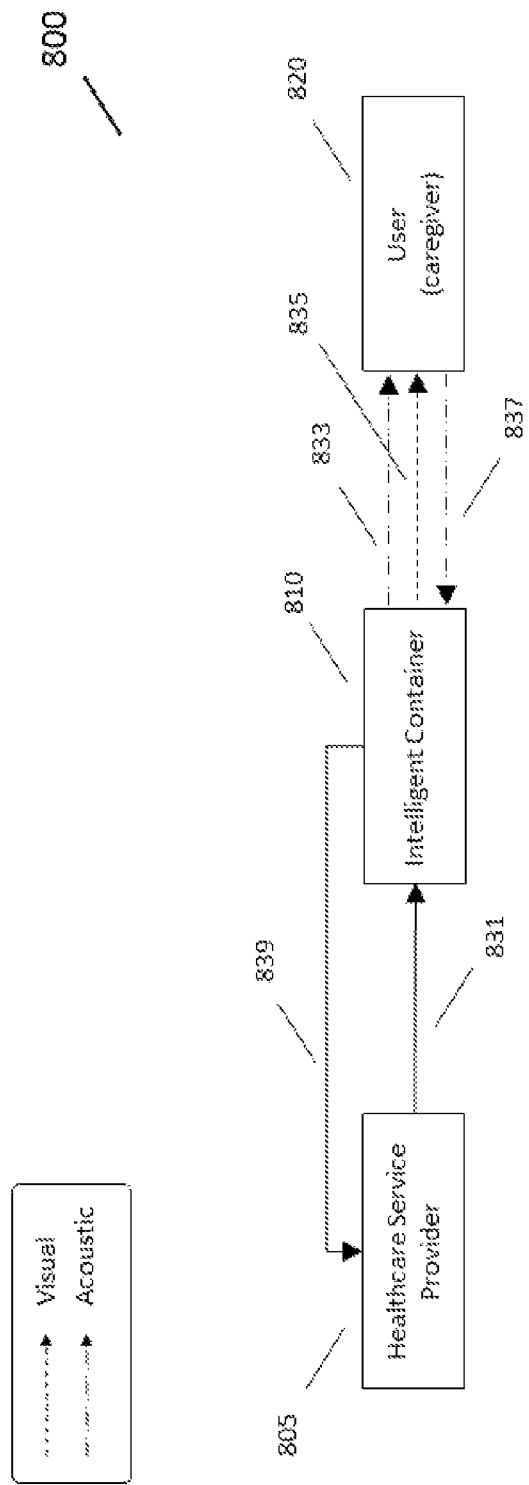

AUTHENTICATING AND AUTHORIZING USERS REGARDING PHYSICAL GOODS

RELATED APPLICATIONS

This application claims priority to U.S. provisional patent application No. 62/732,660, filed Sep. 18, 2018, and entitled "User Specific Actions Regarding Physical Goods." This application is related to U.S. Pat. No. 10,152,905, entitled "Symbol Verification for an Intelligent Label Device" and to U.S. Pat. No. 10,078,977, entitled "Optically Determining Messages on a Display," both of which are incorporated herein by reference. This application is also related to U.S. patent application Ser. No. 15/228,270, entitled "Transaction Agents and Systems." to U.S. patent application Ser. No. 15/668,482, entitled "Verifying Messages Projected From an Intelligent Audible Device," to U.S. patent application Ser. No. 15/602,885, entitled "Agents and Systems for Rights Management," to U.S. patent application Ser. No. 15/890,312, entitled "Polymorphic Electro-optic Displays," to U.S. patent application Ser. No. 16/010,485, entitled "Intelligent Container System," to U.S. patent application No. 62/760,534, entitled "Fail-safe Intelligent Label and Container System," and to U.S. patent application No. 62/890,479, entitled "Autonomous Multi-medium IoT Devices and Systems," all of which are incorporated herein by reference.

FIELD OF THE INVENTION

The field of the present invention is portable electronic devices having a processor for determining what user is proximate the device, and authenticating or authorizing that user.

BACKGROUND

In the world of IoT (Internet of Things) and smart devices, desirable outcomes often depend on the participation of a specific user (or one or more specific users, or a group of specific users) in the presence of, or proximate to, a specific "thing". Of particular interest are things or "goods" that are transportable or mobile, or otherwise have multiple custodians or users.

Determining, and appropriate to the use, authenticating or authorizing (granting permissions) that a specific user ("user") in proximity of a particular good is important in many applications and to their outcomes, e.g., Adapting instructions regarding a thing to a specific user, and monitoring a user's compliance with them (e.g. patient prescriptions and compliance with them)

Providing one-time or limited authorization to enter or exit a secure facility, use an item, or access information or rights Confirming delivery of a particular item to, and acceptance by, a particular individual In general, such applications involve one or more of the following regarding a particular thing:

authenticating specific users (proximate the thing)

authorizing, affecting, or effectuating local actions or transactions by specific users associating specific users with local actions or remote transactions Of particular interest are user authentication or authorization activities that relate to locally determined conditions or circumstances of a good, a user or their location. And further, that preferably are not dependent on A password/code or other information that needs to be remembered, stored or retrieved by the user A specific appliance (e.g., a registered mobile phone or notebook or tablet)

Limitation to a particular location (e.g. due to 'fixed' user communication device or IP address)

An always-on internet/remote connection

Foregoing privacy or security

Accordingly, disclosed herein are novel systems and methods for authenticating and authorizing specific users proximate a good using their vocal characteristics without comprising their privacy.

SUMMARY

A portable intelligent device is provided that has an audio input for receiving a voice input from a user and an event manager for detecting that an event has occurred. The intelligent device also stores a passcode and a voice-code indicative of the passcode that is unique to a particular user. The intelligent device presents the passcode to a user, for example, from a display on the device, or from smart phone or tablet wirelessly connected to the intelligent device. The user speaks the passcode into an input transducer (microphone) on the intelligent device, and a processor generates a voiceprint that reflects the spoken passcode. The processor then can use the stored voice-code and the generated voiceprint to determine if a specific user was speaking, and if the user spoke the correct passcode. In this way the intelligent device is able to authenticate or authorize a remote user simply by having the user anonymously speak a passcode into the intelligent device.

In one example, the intelligent device is integrated into a prescription pill bottle. The bottle has been filled by the pharmacist for a specific patient, and the pharmacist loaded the passcode, the patient's voice-code and the patient's prescription into the intelligent device before mailing the pill bottle to the patient. In response to a passcode presented by the intelligent device (for example when it is time to open the pill bottle and take their medication), the patient speaks the passcode into the integrated microphone of the intelligent device. The processor in the intelligent device then authenticates the patient by evaluating the spoken passcode with the stored voice-code. If the evaluation is successful, the pill bottle stores a record of the results and resets the display. If the evaluation isn't successful, the pill bottle may present a visible alert and wirelessly transmit an alarm message. In another example, the intelligent device may communicate back to the pharmacist that the intended patient has received the medication. Or if wrong user speaks the passcode, then the pill bottle may generate an alert or alarm and transmit a message to the pharmacist.

Advantageously, the intelligent device is able to confidently determine if a specific user was in the presence of a good, such as a pill bottle, and they were taking a correct action (e.g. opening or closing the pill bottle). Further, since the events are time-stamped, a complete history of how the user interacted with the good may be constructed.

BRIEF DESCRIPTION OF THE DRAWINGS

FIG. 3. is a block diagram showing generation of a synthetic voice-code.

FIG. 6A is a block diagram representing an exemplary application comprising an intelligent pill bottle, user communication device and remote evaluation.

FIG. 8 is a block diagram of an exemplary application comprising an intelligent pharmaceutical container system and remote evaluation.

DESCRIPTION

Figure 1:
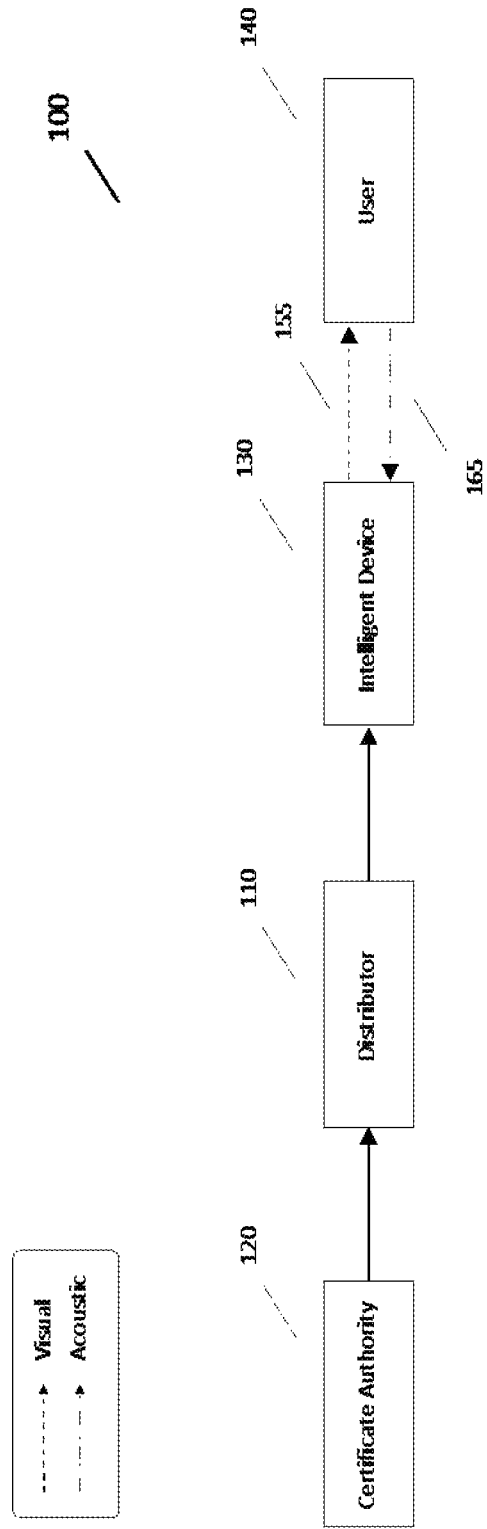
FIG. 1 is a block diagram representing a simple authentication and authorization ecosystem FIG. 2. is a block diagram showing generation of a native voice-code.

As the term is used herein "things" are physical items or "goods" (the term used here forward) that are the focus of local user actions and/or remote transactions. Goods may be consumables, disposable or durable; raw materials, components, sub-assemblies or finished goods; single/multi-use; perishable or non-perishable; tools, items of equipment, appliances, machines, dispensers (e.g. liquids, foods, tickets, products), vending machines, conditional use/access systems, (e.g. parking meters, rental scooters or bicycles) locks and locking (and unlocking) systems; vehicles (e.g., autonomous delivery vehicles or drones) etc.

Intelligent devices (or the functions thereof) are attached or coupled to, embedded within, or otherwise bound to goods. Exemplary intelligent devices include smart labels, tags, containers, packaging, stored value and security cards, containers etc. Of particular interest are intelligent "hardware agents" and related systems as described in U.S. patent application Ser. No. 15/228,270 Transaction Agents and Systems and Ser. No. 15/602,885 Agents and Systems for Rights Management. Unless stated otherwise, the term intelligent device shall be understood to encompass hardware agents.

Intelligent devices generally comprise: a processor, a memory, a clock/timer, communication circuitry (typically wireless), a source of power (e.g. a battery or capacitor, or RF, optical, thermal or mechanical harvested energy), a user message medium (e.g. visual, acoustic or haptic) and an audio input transducer (e.g. a microphone) for capturing a user's voice. They may also include one or more sensors (e.g. temperature sensor, a shock sensor, a vibration sensor, a motion sensor, a pressure sensor, a strain sensor, a chemical sensor, a radiation sensor, a humidity sensor, an acoustic sensor, or a light sensor) or actuators.

Intelligent devices comprise an event manager: functions or operations performed by the processor and circuitry coupled to clocks/timers, sensors, circuitry (e.g. location circuitry and communication circuitry), actuators etc. that collectively monitor and take actions in response to events during the lifecycle of the intelligent device/good. Exemplary events include local communications and interactions (e.g. mechanical, electrical, optical communications with users), actuation, elapsed time, changes in sensed or monitored environmental or internal conditions including mechanical action, detected sound or light, or heat, changes in location, tampering, malfunction, and loss of power.

Intelligent devices operate autonomously according to stored or embedded instructions (rules) that govern the device's operation. And further in the case of hardware agents, enforce individual sets of instructions for each of a plurality of stakeholders in the good or its outcomes, according to the respective rights of the stakeholders.

Intelligent devices may also include message verification circuitry such as that disclosed in U.S. Pat. No. 10,152,905 Symbol Verification for an Intelligent Label Device, U.S. Pat. No. 10,078,977 Optically Determining Messages on a Display, U.S. Pat. No. 10,147,098 Symbol Verification for an intelligent Label Device and U.S. Pat. No. 10,168,298 Electrically Determining Messages on an Electrophoretic Display, and U.S. patent application Ser. No. 15/668,482 Verifying Messages Projected From an Intelligent Audible Device and U.S. provisional patent application 62/890,479 Autonomous Multi-medium IoT Devices and Systems. Message verification circuitry can be used to increase confidence that passcodes and other information presented by user message mediums (e.g. those responsive to evaluations as described below) are as intended, and if not, what messages were actually presented. Similarly, and cooperatively, verification circuitry can increase confidence in wireless communications (e.g. the broadcast of alerts and alarms responsive to evaluations).

In certain embodiments of the inventions described herein, a user may use a user communication device cooperatively with an intelligent device. A user communication device is typically configured to capture a user's voice (voice-data) and (1) accept input from a user (e.g. via a keyboard, keypad, touchscreen, microphone or camera), (2) wirelessly communicate with appropriately configured local intelligent devices (e.g. via RFID, Bluetooth/BLE, Wi-Fi, IR) and/or (3) communicate with remote entities via the internet/wide area networks. Exemplary user communication devices are mobile phones, tablets, notebooks as well as internet connectable appliances. In certain applications a stationary, always connected/connectable variant of the user communication device may be advantageous. User communication devices generally do not need to be associated with a specific individual.

Note that the configuration of the intelligent device may vary depending on the role, if any, of a user communication device in a particular implementation. For example, an intelligent device may not need a microphone or a user message medium if they are provided by a user communication device.

The following is an example (FIG. 1) of a simplified user authentication and authorization system 100 and method where:

A certificate authority 120 generates one or more passcodes and voice-codes indicative of the passcodes A distributor 110 (1) provisions an intelligent device 130 with the passcodes and corresponding voice-codes, (2) binds the intelligent device to a good (or the good's packaging or container) and (3) distributes the good intelligent device 130, responsive to an event, presents a passcode 155 stored in its memory to a user 140 proximate the good via a visual user message medium The user 140 vocalizes the passcode 165
The intelligent device 130 (1) creates a voiceprint of the user-vocalized passcode and (2) evaluates the voiceprint with the voice-code to authenticate or authorize the user A passcode is any code that may be visibly or audibly (or haptically) presented to a user by a user message medium (e.g. display or indicator, speaker (e.g., audio output transducer) or vibrator or surface fluctuating device) of an intelligent device, or a user communication device (e.g., a mobile phone or tablet) communicatively coupled to the intelligent device and configured to acquire the passcode and present it to the user via its own message mediums.

Passcodes may be fixed or variable, static or dynamic, public or private, single or multi-use, encrypted or unencrypted. Passcodes may be used in different combinations or series or randomly rotated. Passcodes may be pre-printed (e.g. bar code or text string) on the intelligent device, packaging or good. One passcode may have multiple corresponding voice-codes (e.g. to authenticate/authorize a group). A single voice-code may have multiple passcodes. A visually presented passcode may be persistent, temporary (stable, volatile); switchable, self-switching, non-switchable, or a combination thereof. Passcodes may be symbolic and associated with a plain text "key word" that can be spoken (e.g., an image of a "cat", a shape "square" or color "blue"). Passcodes may also comprise a series of symbols or alphanumeric characters presented concurrently or sequentially, and by different combinations of message mediums (e.g. audible or visual). An intelligent device may instruct a user as to what combination of symbols or their attributes (shape, color, quantity, etc.) they should vocalize, and what order.

Passcodes are typically generated and managed by a certificate authority. In some implementations stakeholders and users may however generate their own passcodes. Passcodes are then loaded/stored (provisioned) into intelligent devices, typically by a 3rd party that binds the intelligent device, and the passcode(s) and corresponding voice-code(s), to the good (e.g., a manufacturer, product packager, distributor, seller, transporter).

For the purposes of simplicity and clarity, the term certificate authority shall refer to the entity that creates and manages the passcodes (and voice-codes, user voice-profiles etc.). The entity that generates the passcodes also typically manages the lifecycle of the passcodes (expiration, renewal, use count etc.) and either independently or in cooperation with other parties, tracks user actions and transactions based on the passcodes (authorization, denial of service or access etc.)

A stakeholder is any entity that has a stake in any outcome of a good or related systems, actions or transactions. A stakeholder may perform some or all of the functions of a certificate authority.

In healthcare/patientcare, exemplary stakeholders include healthcare professionals, professional offices/groups, clinics and hospitals (and larger organizations comprising them), pharmacies, pharmaceutical manufacturers and distributors, insurance providers, employers, regulatory agencies and patients and their families, caregivers etc. Stakeholders may or may not be custodial and may or may not be directly involved in local actions or remote transactions involving or related to the good, intelligent device or other stakeholders.

A voice-code is an analog or digital signature of a passcode vocalized (spoken) by a specific user, or, machine generated using a user's voice-profile. FIG. 2 illustrates a voice-code generated from a user-vocalized passcode referred to herein as a native voice-code. FIG. 3 illustrates a voice-code generated using a voice-profile, and referred to herein as a synthetic voice-code. Native voice-codes and synthetic voice-codes are private and generated, stored and otherwise managed by secure parties and systems (e.g. certificate authorities).

A voice-profile is a model of a user's vocal characteristics determined from user voice-data that can be used to generate user-specific voice-codes without the concurrent participation of the user. A user's voice-profile can also be used to obtain the passcode underlying a user's voiceprint (described below).

A voiceprint is an analog or digital signature (analogous to a fingerprint) of a user-vocalized passcode, where the passcode is presented to the user in-situ by an intelligent device or a user communication device (described below). A voiceprint may be evaluated in a variety of ways to authenticate or authorize a specific user and take actions accordingly.

One exemplary method of evaluating a voiceprint is pattern matching (e.g. comparing and evaluating a previously generated voice-code with the locally generated voiceprint). This approach implicitly takes into account differences in languages and regional dialects as well as differences in speech patterns and the vocal characteristics of the users. The evaluation rules and systems may further employ systems and methods for determining and evaluating the level of confidence in the results of the voiceprint evaluation.

Evaluation at the site of the user and good can be performed in response to a locally presented passcode, using a locally generated voiceprint and a previously generated, locally stored or remotely accessible, voice-code. In one preferred embodiment, the intelligent device generates and stores the voiceprint, then performs the evaluation using a voice-code previously stored in its memory. In other implementations the voiceprint is generated and stored in a user communication device that can access a previously generated voice-code stored in the intelligent device (or from the certificate authority e.g., using an identifier from the intelligent device) and accordingly, perform the evaluation.

The location of the intelligent device, as self-determined with integrated location circuitry (e.g. cellular, local area; location-based services, geo-fencing) can increase confidence that a user, is an intended user. For example, that the location of the intelligent device is consistent with the expected location of the user: e.g. the delivery location of a good to a specific buyer or consumer; the care facility of a prescribed medication for a specific patient (e.g. their home address), or the facility where permission to access is to be granted, or equipment is to be used.

In some implementations, the intelligent device will dynamically generate the passcode (e.g. in response to life-cycle events). Evaluation of a related voiceprint (described below) requires having access to the passcode as well as the user's voice-profile (described below) and a way to associate them. Since the passcode may be public for only a short period, and in an adequately private environment, it may be sufficient to digitally encrypt the passcode (and voiceprint) for communication to the device or entity performing the evaluation, e.g., a user communication device or certificate authority respectively.

Evaluation at a location remote from the user and good can be performed by a remote evaluation system, e.g., that operated by a stakeholder or a certificate authority. In a typical embodiment, the user communication device sends from the user's location, a voiceprint (or voice-data) and an "identifier" (ID) to the remote evaluation system. The remote evaluation system uses the identifier to retrieve a previously generated voice-code that corresponds to the received voiceprint, then evaluates the voiceprint with the voice-code. Alternatively, the user communication device also sends the passcode corresponding to the voiceprint from the user's location, to the remote evaluation system. The remote evaluation system uses the identifier to retrieve the voice-profile corresponding to the voiceprint and contemporaneously generate a synthetic voice-code using the passcode and voice-profile, which it then uses to evaluate the voiceprint. In a variation of the latter embodiment, the passcode could alternatively be retrieved by the remote evaluation system from a database of passcodes using the identifier. Note that multiple parties, e.g. a stakeholder and certificate authority) could collaboratively performed the functions just described.

Typically, the identifier is generated by a stakeholder or a certificate authority and accompanies the intelligent device or companion good to the user's location. In the simplest implementation, the identifier is used to determine and retrieve the previously generated voice-code to be used in the evaluation. The identifier can be private or public (e.g., visibly—including printed, acoustically or wirelessly presented). Importantly, an association with a user's identity (or alias) is not required.

A valuable aspect of the authentication and authorization systems and methods described herein is that the user can remain anonymous (the user isn't identified or identifiable), incognito (an alias is used—typically for single or limited use) or identifiable (the user can be identified but their identity is not necessarily public), or identified as a member of a group of authorized users.

Note here and elsewhere, the evaluation process requires appropriate circuitry/software ("evaluation circuitry") located where the evaluation is performed (e.g. in the intelligent device or user communication device if the evaluation is local to the good and user). Circuitry/software for generating voiceprints ("voiceprint circuitry") is similarly required.

The results of an evaluation (e.g. authentication a user present a good) may authorize or initiate actions by the intelligent device or depending on the implementation, an application on a user communication device. Exemplary actions by the such devices in response to an authorized user voiceprint include enabling access to stored information, building a history of user specific interactions, sensing conditions, presenting messages (e.g. access codes, alerts/alarms, financial or other transactional information, enabling access to functions of, or operation of, a good etc.

The results of evaluations may also affect specific users' behaviors, e.g. taking actions or effectuating transactions regarding goods. For example, in response to previously described actions of an intelligent device. More expansively, the results of an evaluation that successfully authenticates specific user proximate a good, and at a particular moment in time, can be used to improve user compliance (see below) and optimize user behaviors that affect the outcomes of goods (and corresponding transactions). Knowledge of a specific user's presence with a good at a particular moment in, or period of, time can be advantageously combined with knowledge of the coincident actions taken by the intelligent device, e.g. visual, audible or wireless messaging presented the user and the corresponding actions taken (or not taken) by the specific user in response. And further, the results of an evaluation can be used to authorize a specific user—grant them permissions, without having to identify them.

The user's actions (or lack thereof) may be determined by an intelligent device (or user communication device). They may also be determined by correlating data received from an intelligent device and user-initiated transaction data from external system. An example of the latter being a decrement to an inventory system of a replacement good when the current one is no longer fit—for use. Another example is a caregiver reporting (or not reporting) a message presented by an intelligent container containing opioids or other dangerous drugs that was generated because the container had been opened without an authorized user being present.

User compliance with the above processes can be optimized via various performance or outcome-based incentives (or disincentives). Patience compliance in healthcare for example, can be improved by offering incentives (or disincentives) for acting appropriately to the messaging presented by the bottle containing their drugs of when, and when not, to take them. And further, encouraging their proper storage/safety—e.g., to make sure that any access by anyone other than the authorized patient is acted upon. Exemplary performance/outcome-based incentives include:

Waiving of fees such as insurance copays, reducing insurance deductibles

Discounts on future prescription purchases

Automatic reordering of prescriptions (or rejection of refill requests without consultation)

Multiple prescription dosage management at a discount

In one exemplary process 200 for generating a native voice-code (FIG. 2) a user using an audio enabled internet connected computing device (e.g. computer, notebook, tablet or mobile phone), establishes a secure communication 203 with a certificate authority. The certificate authority generates passcodes 205 and sends them to the user. The user vocalizes the passcodes (creating voice-data) 207 which are sent to a certificate authority. The certificate authority receives the vocalized passcodes and creates and stores corresponding native voice-codes 209.

In an exemplary process 300 for generating a synthetic voice-code (FIG. 3), a user using an audio enabled internet connected computing device establishes a secure communication with a certificate authority 308. In response to the certificate authority, the user generates voice-data 312 (e.g. the user vocalizes sample words and phrases prompted by the certificate authority) that is captured and used by the certificate authority to create a user voice-profile 314. The voice-profile can be later used to generate synthetic voice-codes based on then or later, the certificate authority generates passcodes 316 that it uses to generate synthetic voice-codes 318 when needed.

Advantageously such processes benefit from AI and in particular generative adversarial networks (GANs). In another process, voice-codes can be created simply by recording, and advantageously refining/processing, and storing the user's vocalization of specific passcodes. Various adaptive noise filtering/cancelling schemes can be used to compensate for variations in the acoustics of the user's environment and system used to create the voice-data.

Voice-codes and voice-profiles can be generated remotely via a secure process like the authorization of credit cards via internet or voice activation. Note that the process described above depends on an appropriate for the use, level of confidence that the person generating the voice-data is correctly identified and authorized. In other words, that person generating the voice-data is authenticated. Various processes may be used for this purpose including two-factor authentication, pre-defined voiceprints, or PINs.

To achieve a high level of confidence in the system, and higher quality voice-data, similar processes for generating voice-profiles and voice-codes can be performed in a trusted facility of a stakeholder or a certificate authority (e.g. a doctor's office, pharmacy, retail clinic, hospital, or employer's human resource office; the office of a bank or other financial institution, or government office).

The stakeholder or certificate authority distributes passcodes, and voice-codes according to the implementation, to the relevant elements of the ecosystem, e.g. for loading into intelligent devices or communication to appropriate user communication devices or authorized stakeholders).

A certificate authority may provide services on behalf of multiple stakeholders (e.g. a patient, the patient's doctor, hospital, pharmacy, insurance company and regulatory agencies), thereby simplifying administration, maintaining a higher level of trust. For example, a certificate authority may perform some or all of the processes for creating, storing, distributing and otherwise managing passcodes, voice-codes, voice-profiles, and evaluations etc. on behalf of the stakeholders.

A passcode may be presented to a user(s) for generating a voiceprint for limited duration, number of times or time periods, or for specific times or locations or other factors to encourage compliance and discourage misuse and tampering. For example, a passcode may only be presented consistent with a patient prescription loaded in an intelligent pill bottle/container such as that described in U.S. patent application Ser. No. 16/010,485, An Intelligent Container System. Advantageously, the evaluation may be limited to a number of attempts or require secondary actions.

A single intelligent device/good may have multiple authorized users and accordingly multiple passcodes, multiple authorized voice-codes per passcode or various combinations thereof. For example, an intelligent pill bottle might support an authorized patient, a family member, and/or healthcare provider. A single intelligent device/good may also have different instructions/rules conditioned on the determination of specific user or users.

As with previously described processes for generating voice-data, voice-codes and voice-profiles, adaptive noise cancellation or other signal processing techniques may be used to improve performance when creating voiceprints (e.g. to compensate for ambient sounds, or characteristics of the devices used, e.g. microphones/speakers).

Advantageously, acoustic watermarks and steganographic marks can be employed to increase confidence in the determination of a specific user's proximity to a good, and local actions and global actions that depend on them. For example, during the creation and evaluation of a voiceprint, or linked to specific, appropriate enabled hardware/devices (intelligent devices, mobile phones with specific/appropriately configured software/vocoders). Of particular interest are machine discernible, inaudible (to humans) acoustic marks. And further, those optimized for particular appliances/vocoders (e.g. mobile phones).

In one application of the systems and methods described herein, a voiceprint can be used to screen a user for being 'fit-to-consume' or "fit-to-use". For example, is a patient awake and cognizant of the decision/action to be taken?

In another application of the systems and methods described herein, a user's voice can be used to mark or otherwise secure the collection/transmission of data/information to a 'trusted' stakeholder. This approach has the benefits of being device agnostic and the user doesn't need to remember, look-up or safely store a security code. And importantly, it gives the user control over the securitization and downstream use of their personal information.

For security and privacy reasons, it is preferable that at least a portion of an intelligent device's memory cannot be accessed externally (e.g. the portion that stores voice-codes or voice-profiles).

Also, for security and privacy reasons, it may be preferable that after their useful life, or in the event of failed evaluations or tampering, that some or all of stored voice-prints, voice-codes and especially voice-profiles, are self-erased (forgotten) by the intelligent device.

EXEMPLARY APPLICATIONS

The following examples illustrate the application of user authentication and authorization systems and methods regarding a good. It is to be understood that only the salient elements are described and that many other variations are possible consistent with the inventions described herein. Each of the following examples are healthcare applications, however it should be understood that the inventions described are applicable to a wide range of other uses.

Except as noted, central to each of the following example applications is an intelligent pill bottle (intelligent device) comprising:
 A processor, a memory, a clock/timer and a battery
 BLE, (or other local area wireless communication circuitry
 Sensors/circuits for determining whether the pill bottle is open or closed
 A visual messaging medium(s)
 A microphone for capturing the user-vocalized passcodes
 Event and evaluation circuitry
 A passcode and a voice-code stored in the memory In the following examples, only one passcode and one voice-code are illustrated. In practice a single passcode could be reused, however a more secure option is to use multiple passcodes and voice-codes for the same user (e.g. a patient in the following examples). Depending the condition of the user (patient) and the presence of a trusted at-home care provider, it may be advantageous to have one set of passcodes and two sets of corresponding voice-codes. In that way either the patient or the care provider can be authenticated or authorized as appropriate to the current circumstances. Note that a patient identifier is not require.

Exemplary Healthcare Application 1—Intelligent Pill Bottle and Local Evaluation

Figure 4A:
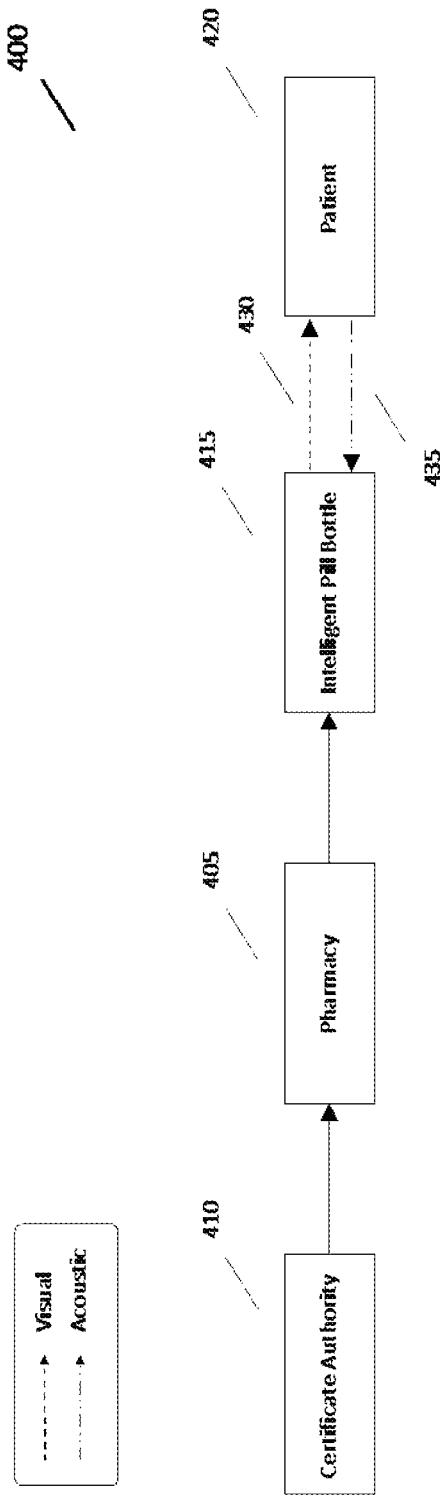
FIG. 4A. is a block diagram representing an exemplary application comprising an intelligent pill bottle and local evaluation of a voiceprint and a voice-code.
Figure 4B:
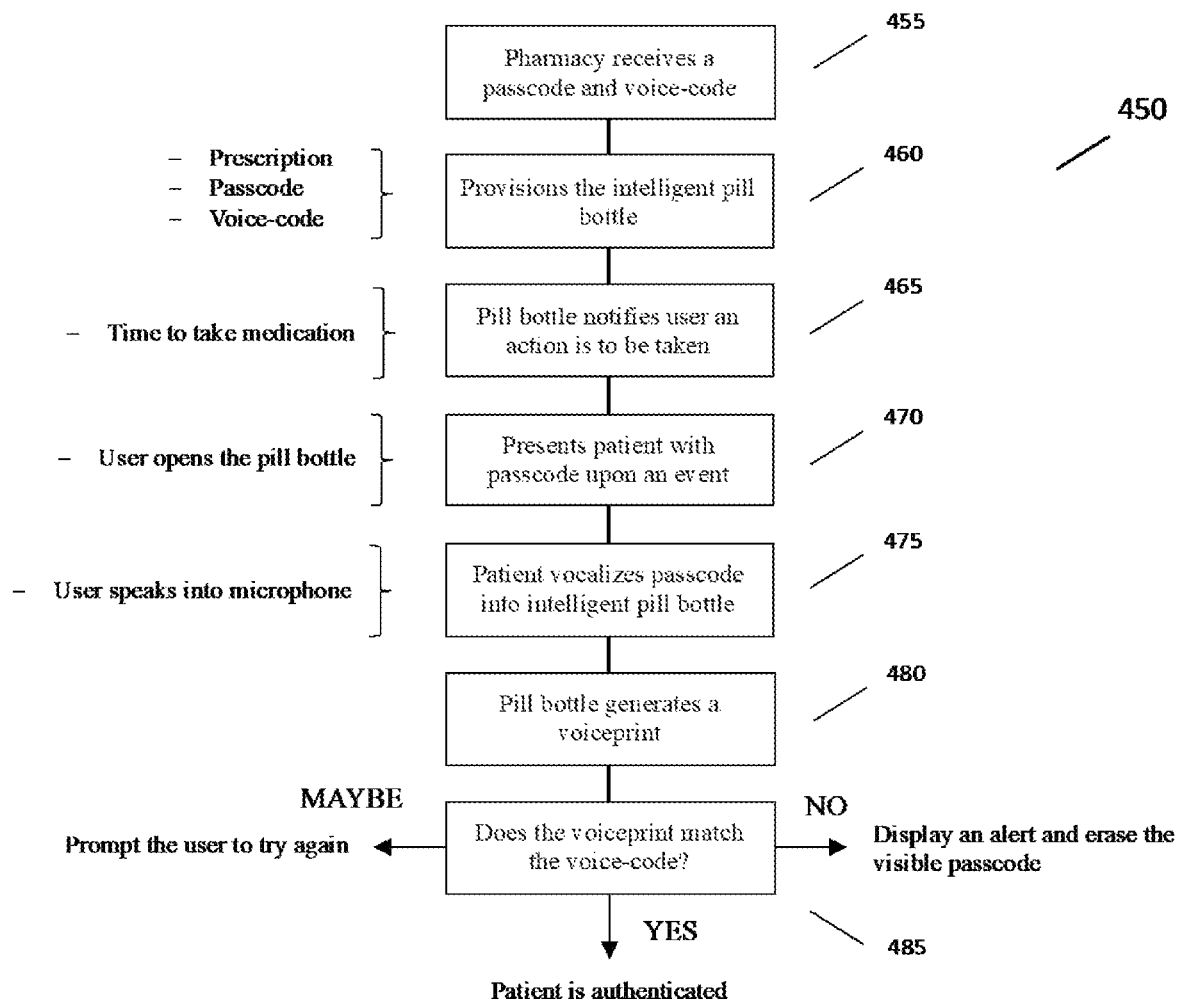
FIG. 4B. is a process block diagram representing an exemplary application comprising an intelligent pill bottle and local evaluation of a voiceprint and a voice-code.

The goals of this application are to (1) encourage compliance (take medicines as prescribed), and (2) to discourage accidental, unintentional or intentional misuse. The solution is to determine if the patient is in the immediate presence of their medication (an intelligent pill bottle when it was prescribed to be taken and took an action indicative of compliance, e.g. the patient opened the pill bottle when visibly prompted to do so. FIGS. 4A and 4B illustrate an exemplary healthcare application 400, 450. In summary:
 A pharmacy (stakeholder) 405
  Obtains a passcode and corresponding patient voice-code from a certificate authority 410 (using an anonymous ID) associated with the patient 455
  Wirelessly provisions the intelligent pill bottle 415 with the patient's prescription (prescribed actions and timing thereof) and the passcode and voice-code 460, and sets the clock/timer The patient 420 or a caregiver picks-up the intelligent pill bottle and takes it home When, according to the instructions operating in the intelligent pill bottle (the prescription), it's time for the patient to take their medication, the patient is visibly prompted (not shown) via the intelligent pill bottle's visual messaging medium 465

When/if the pill bottle 415 is opened, the stored passcode is visually presented 430 on its integrated visual message medium 470

The patient 420 speaks (vocalizes) the passcode 435 to the microphone in the intelligent pill bottle 475

The intelligent pill bottle generates and stores a voiceprint of the user-vocalized passcode 480, and evaluates the voiceprint with the voice-code stored in memory 485

If the voiceprint matches the voice-code (indicating that the patient is present and complying with the prescription) the intelligent pill bottle, erases the visual passcode from the display If the voiceprint does not match the voice-code, and It's a near miss (likely to be the patient's voice, but the evaluation isn't definitive), the agent generates a visual prompt for the patient to try again It's a clear miss (not likely to be the patient's voice) the agent generates a visual alert and a wireless alarm indicating use by someone other than the patient If a valid voiceprint is not generated (or no vocalized pattern is presented) within X minutes of the pill bottle having been opened (indicating the possibility of unauthorized use), the intelligent pill bottle generates visual alert and a wireless alarm If the intelligent pill bottle is not opened during the prescribed time period, it generates a visual and optionally wireless alert (e.g., to notify a caregiver)

When a valid voiceprint is generated, or if no valid voiceprint is generated within X minutes (or Y attempts) of the passcode being presented, the passcode is erased from the visual messaging medium.

In all cases, the intelligent pill bottle maintains a secure log of all events (actions, prompts, alerts, alarms etc.) and the times of them, for later review.

Preferably the visual messaging mediums described in these examples, and elsewhere herein are capable of presenting polymodal visible information (e.g. a polymodal display apparatus or a polymorphic display as described in U.S. patent application Ser. No. 15/890,312 Polymorphic Electro-optic Displays). The intelligent pill bottles described herein are related to intelligent container apparatuses, systems and methods described in U.S. patent application Ser. No. 16/010,485 Intelligent Container System and U.S. patent application 62/760,534 Fail-safe Intelligent Label and Container Systems.

Figure 5A:
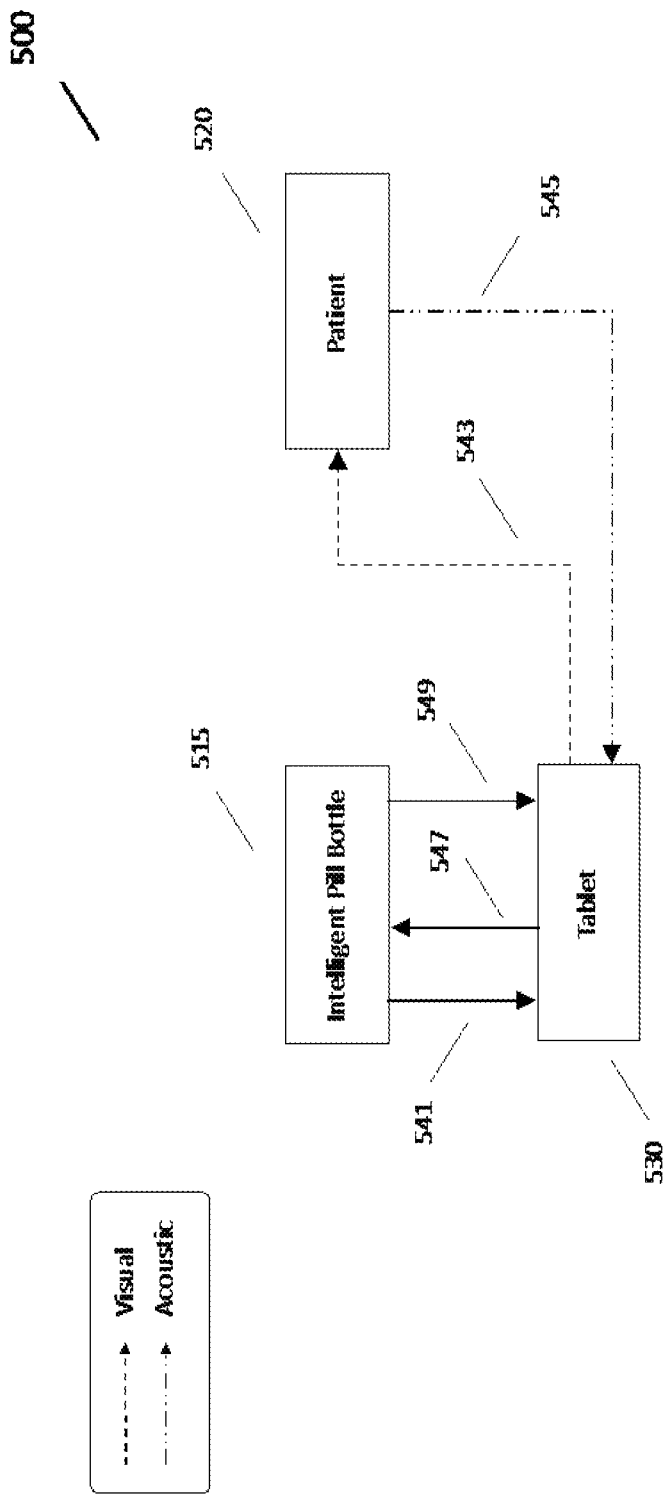
FIG. 5A. is a block diagram representing an exemplary application comprising an intelligent pill bottle, a user communication device and local evaluation.
Figure 5B:
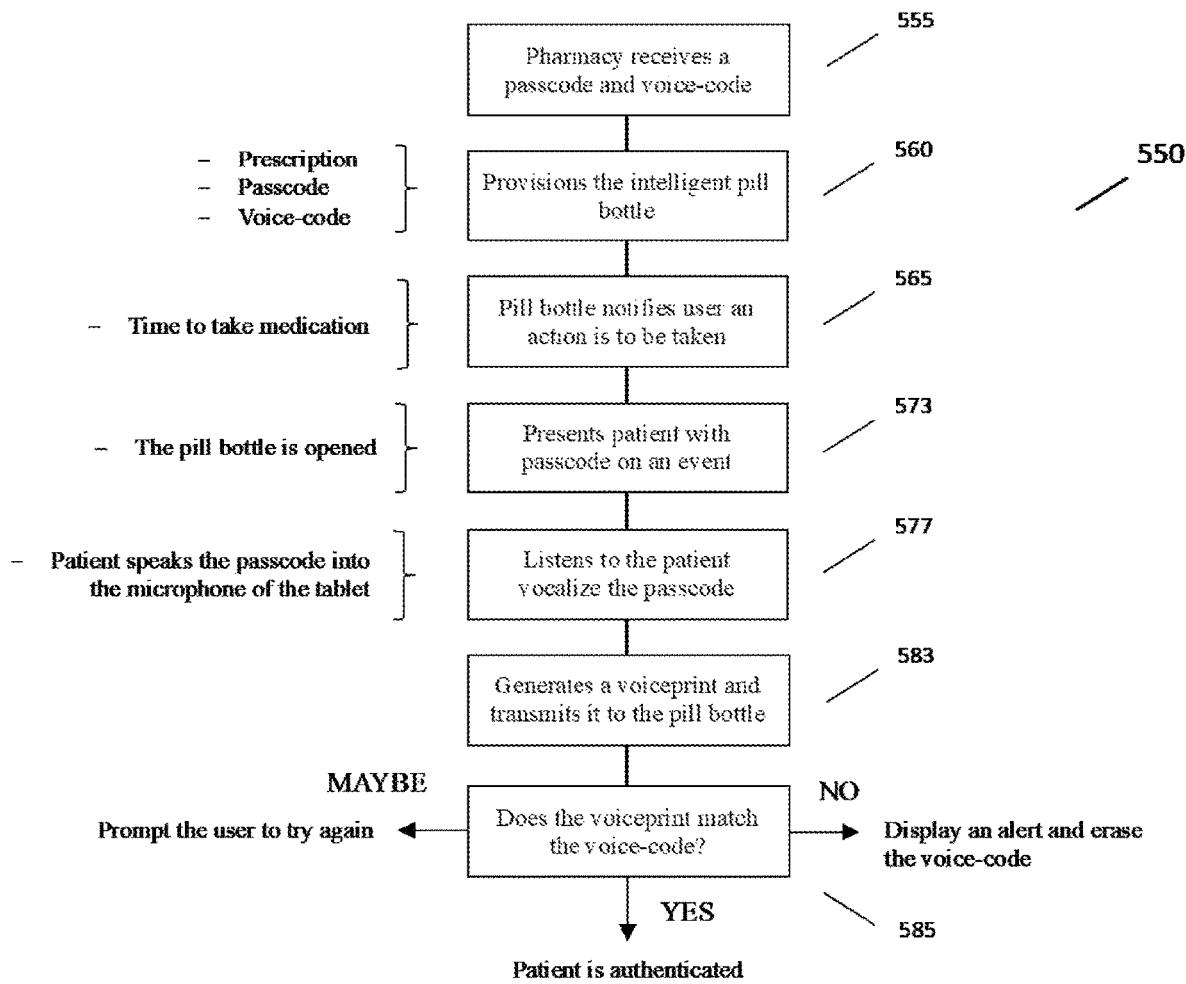
FIG. 5B. is a process block diagram representing an exemplary application comprising an intelligent pill bottle, a user communication device and local evaluation.

Exemplary Healthcare Application 2—Intelligent Pill Bottle, User Communication Device and Local Evaluation This healthcare exemplary application 500, 550 (FIGS. 5A and 5B) illustrates how functions can be distributed between an intelligent device (the intelligent pill bottle of this example) and a user communication device communicatively coupled to the intelligent device. The intelligent pill bottle 515 in this example, is similar to that in the first example (FIG. 4A), however it is not configured with a microphone, voiceprint circuitry or a visible messaging medium for presenting passcodes.

As in the first example, a pharmacy (stakeholder) 555 receives a passcode and voice-code from a certificate authority, and provisions the intelligent pill bottle with the passcode, voice-code and the patient's prescription 560. The intelligent pill bottle 515 according to the provisioned prescription (instructions) manages timing, duration and sequencing steps in the authentication processes.

The user communication device 530 (a tablet in this example), is configured with an appropriate app (or access to a webservice) visual message medium (display) for presenting passcodes, an acoustic message medium (speaker), microphone, input interface (acoustic or tactile—keypad, keyboard, touchscreen etc.) and voiceprint circuitry. The wireless communication circuitry in both the intelligent pill bottle and the user communication device is BLE (Bluetooth Low Energy).

As with the first example, when, according to the instructions operating in the intelligent pill bottle 515 (the prescription), it's time for the patient 520 to take their medication, the patient is prompted via the intelligent pill bottle's messaging medium (not shown) 565. When intelligent pill bottle is opened:

The tablet (user communication device) 530:

Wirelessly acquires the passcode 541 from the intelligent pill bottle 515 and visually presents (and subsequently erases) the passcode 543 for the patient 520 to vocalize 573

"Listens" to the patient vocalize (speak) the displayed passcode 545, 577

Generates a voiceprint corresponding to the vocalized passcode, and transmits it 547 to the intelligent pill bottle 583

The intelligent pill bottle 515:

Wirelessly receives and stores the voiceprint transmitted by the tablet

Evaluates the voiceprint against the voice-code stored in its memory and stores the results of the evaluation 585

Generates and transmits alerts, alarms or messages 549 appropriate to the results of the evaluation to the tablet 530 (and/or another monitoring device or a remote entity not shown).

Note that a variety of combinations and sequences of steps can be employed in cooperation with the stored instructions (prescription) and operation of an intelligent device (intelligent pill bottle). For example, the user could open the intelligent pill bottle, take their medication and close the pill bottle, and the authentication process continue without interrupting the desired patient behavior. In other words, the user communication device could be synchronized such that the authentication process was implemented immediately prior to, during, or immediately after the patient takes their medicine.

As appropriate to the application, the intelligent device and user communication device, together or individually, maintain logs of all events (actions, prompts, alerts, alarms etc.) and their respective times for later, secure access. The user communication device can also be used in cooperation with an intelligent device (and optionally a local or remote wirelessly connected third party) to implement two-factor authentication processes.

Figure 6B:
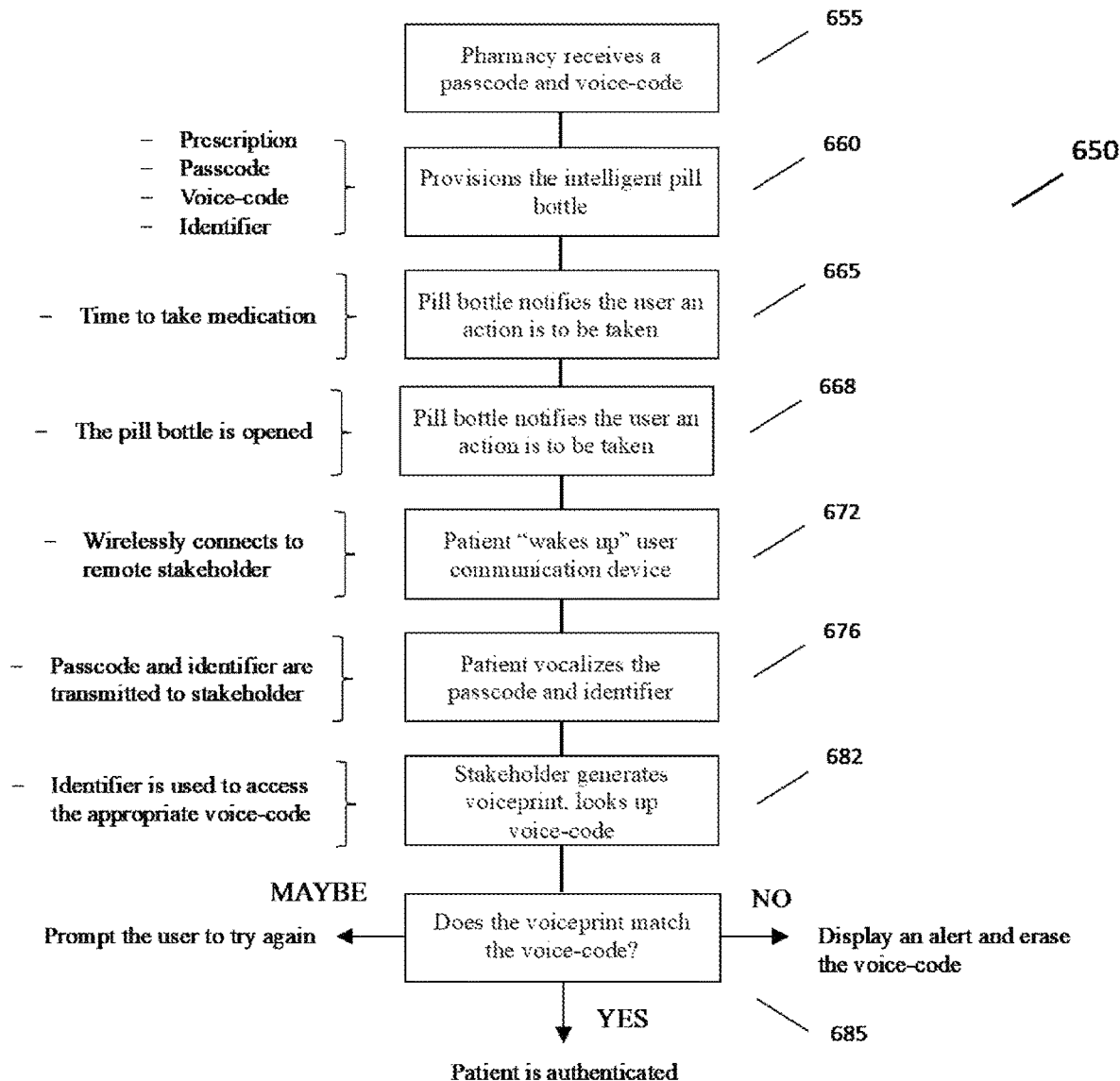
FIG. 6B. is a process block diagram representing an exemplary application comprising an intelligent pill bottle, user communication device and remote evaluation.

Exemplary Healthcare Application 3—Intelligent Pill Bottle, User Communication Device and Remote Evaluation This exemplary healthcare application 600, 660 (FIGS. 6A and 6B) illustrates how functions can be distributed between an intelligent device (the intelligent pill bottle of this example) and a communicatively coupled user communication device (in this example an internet connected, BLE and acoustically enabled appliance analogous to an Amazon Alexa or Apple Home Pod 'smart speaker'), and a remote stakeholder or certificate authority (or other parties). In this example, the intelligent pill bottle, is configured with BLE communications, an ID (e.g. a prescription number printed on a label of the intelligent pill bottle), and visual message mediums for presenting passcodes alerts/alarms and other messages. Unlike the previous examples, the intelligent pill bottle in this example is not configured with evaluation circuitry; the evaluation is performed by a remote stakeholder.

As in the previous examples, a pharmacy (stakeholder) receives a passcode and voice-code from a certificate authority 655, and provisions the intelligent pill bottle with the passcode, voice-code and the patient's prescription 660. The intelligent pill bottle 615 according to the provisioned prescription (instructions) manages timing, duration and sequencing steps in the authentication processes.

According to the prescription provisioned in the intelligent pill bottle, a visual prompt is generated when it's time for the patient to take a pill 665. And as described above, according to the instructions set in the intelligent pill bottle, the intelligent pill bottle presents a visual passcode 633, 668. When the intelligent pill bottle 615 is opened:

The patient 620 "wakes up" 635 the user communication device 630, 672, enabling the appropriate voice-based application and processes (i.e. Alexa skill). The voice-based application prompts the patient to "speak" the passcode and ID 637 to the user communication device 630, 676. The user communication device then transmits the vocalized passcode and ID 643 to the remote stakeholder or certificate authority 610.

The remote stakeholder/certificate authority 610
  Receives 643 and converts the ID into text (speech-to-text) or other machine processible code, and the vocalized passcode into a voiceprint 682
  Uses the text ID to determine (look-up) the appropriate voice-code 682, and
  Evaluates the voiceprint with the voice-code 685, and according to the results of the evaluation executes one or more transactions e.g., transmit instructions/data 645 to the user communication device 630 or updates patient records, flags abuse, low or high levels of compliance, risky behavior, notifies other stakeholders (e.g. doctors, hospitals, pharmacies)

Exemplary Healthcare Application 4—Intelligent Pill Bottle, ePRO User Communication Device and Local Evaluation This example illustrates a system 700 (FIG. 7) comprising a simplified intelligent device and user communication device, where the user communication device performs the evaluation locally. The specific system illustrated is characteristic of ePRO (electronic patient-reported outcomes) systems used in healthcare, and in particular clinical trials, that rely on dedicated user communication devices. Authenticating the user proximate the medication as the intended patient, improves accountability and compliance with the ePRO system and the prescribed trial protocol.

In this example:
The stakeholder is a clinical trial operator 705
The intelligent pill bottle (intelligent device) 715 is configured with
  A processor, a memory, a clock/timer and a battery
  Local area wireless communication circuitry (compatible with that supported by the user communication device)
  The intelligent pill bottle is not configured with a user message medium or evaluation circuitry
The user communication device 730 is an internet connectable tablet (in this example, provided by the clinical trial operator and configured to support ePRO) configured with local area wireless compatible with the intelligent pill bottles, a visual user message medium, microphone (and in this example a speaker) and evaluation circuitry.

Figure 7:
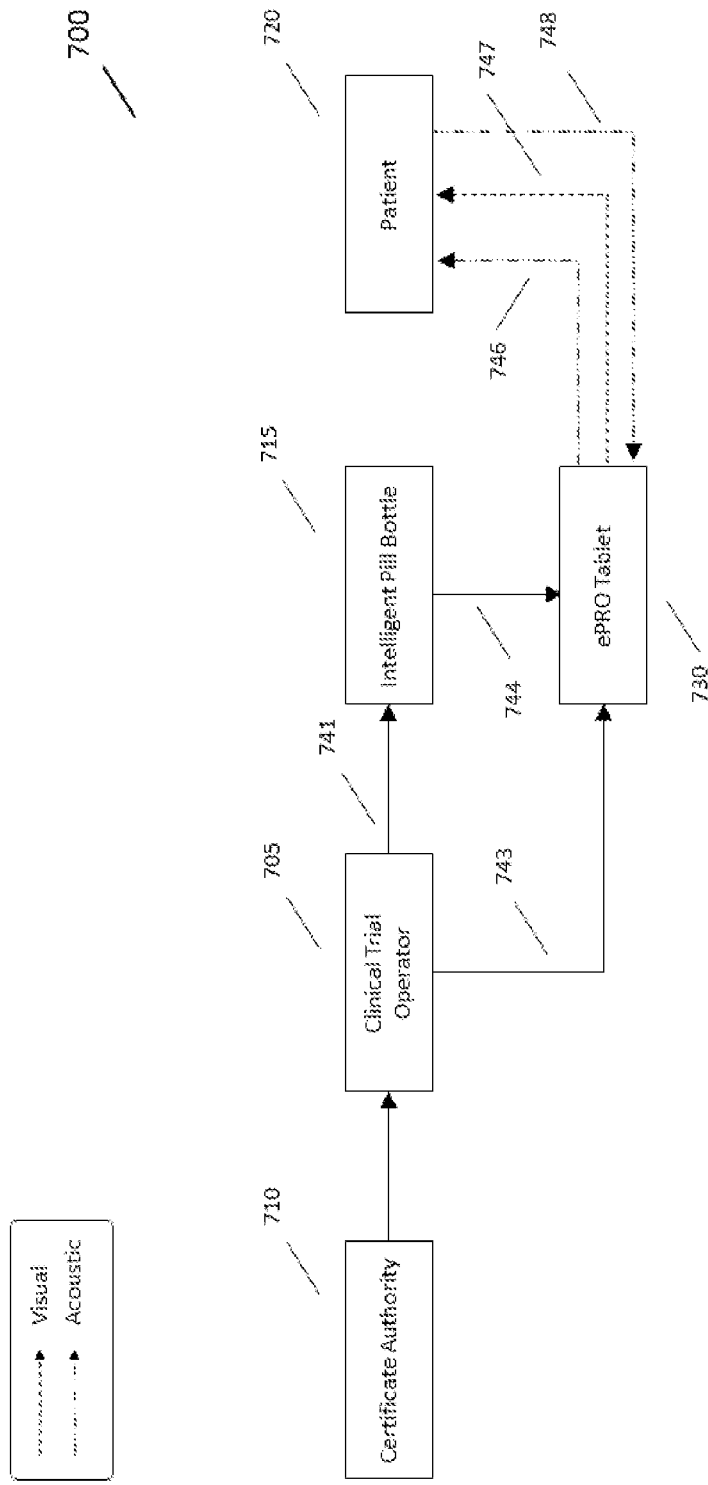
FIG. 7 is a block diagram of an exemplary application comprising an intelligent pill bottle, ePRO user communication device and local evaluation.

As illustrated in FIG. 7:
A certificate authority 710 generates a passcode and a voice-code
The clinical trial operator 705
  Acquires the passcode and voice-code from the certificate authority
  Encrypts the voice-code (and optionally the passcode)
  Provisions the intelligent pill bottle 715 with a passcode and encrypted voice-code, and patient's prescription 741
  Provides the tablet 730 (provisions or sends to the tablet) the key to decrypt the encrypted voice code 743
At the patient's home, the tablet 730 wirelessly connects to the intelligent pill bottle 715 and retrieves the prescription, passcode and encrypted voice-code 744
The tablet
  Audibly prompts 746 the patient when it is time to take their medication
  Visually presents 747 the passcode when the pill bottle is opened (detected by the intelligent pill bottle and wirelessly communicated to the tablet)
  Listens to the patient vocalize the passcode 748 and generates a corresponding voiceprint
  Decrypts the encrypted voice-code using the key stored in its memory
  Evaluates the voiceprint with the decrypted voice-code to authenticate the user as the intended patient (and includes updates the ePRO system accordingly)

The intelligent pill bottle in the above example includes an internal battery. Alternatively, the intelligent pill bottle could be configured to harvest RF energy to power the circuitry (e.g. in cooperation with the RF communication circuity and RF signals transmitted by the tablet). In another variant, the certificate authority encrypts the voice-code (and optionally the PC) and provides the key to decrypt the encrypted voice-code directly to the table. There are of course many other secure-data handling variations.

Exemplary Healthcare Application 5—Intelligent Pharmaceutical Container and Remote Evaluation This example is of a system 800 comprising an intelligent container 810 (intelligent device) similar to the intelligent pill bottle 415 in example 1, however in this case, constructed to be reusable, and further to include wide-area communication circuitry (e.g. cellular) and support for geolocation services. The wide area network enables remote evaluation (akin to example 3) and the geolocation services establish the location of the intelligent container and proximity of the user/patient. Unlike the intelligent pill bottle 415, the intelligent container 810 does not however, need evaluation circuitry nor local area wireless communication circuitry. The latter however would be advantageous for provisioning the intelligent container, although that could be accomplished with the wide area communication circuitry.

In this example the stakeholder is a healthcare service provider 805 that provides in-home patient care, and the intelligent container 810 is:
  Constructed for shipping/storing preformulated/prefilled syringes and to be reusable
  Configured with a processor, a memory, a clock/timer and a battery, a visual user message medium, a speaker, a microphone, sensors/circuits for determining whether the intelligent container is open or closed, and cellular communication circuitry As illustrated in FIG. 8:
The healthcare service provider 805
  Generates a passcode and a set of voice-codes indicative of the passcode and plurality of authorized care givers (e.g. staff of the healthcare service provider), and a container ID, and further associates the container ID with the voice-codes of the set of voice-codes
  Activates the cellular service, and geolocation service
  Provisions the intelligent container with the passcode and prescription (stores the voice-code in a database) 831
  Ships the intelligent container to a patient's home
The patient receives the connected intelligent container
The intelligent container 810
  Audibly prompts the user when it is time to inject the pharmaceutical 833
  Visually presents the passcode to the user when the intelligent container is closed 835
  Listens to the on-site user vocalize the passcode and generates a corresponding voiceprint 837
  Wirelessly transmits over the cellular network, the voiceprint and container ID to the healthcare service provider 839
The healthcare service provider 805
  Uses a location service (not shown) to determine the location of the intelligent container and its proximity to the patient's home
  Identifies the set of voice-codes using the container ID
  Evaluates the voiceprint with the voice-codes in the set of voice-codes, and the determined geolocation, and authenticate the specific caregiver on-site and their proximity to the intelligent container Note the above example, could be easily extended to also authenticate the patient, their presence and being awake using a second user-vocalized passcode (the same or different passcode than the one presented to the caregiver) and corresponding voice-print, and second voice-code for the patient.

In the all the previous examples, and in general all of the inventions described herein, applications, various forms of data security can be employed.

Variations

Applications such as those described above, may be designed for multiple authorized users. For example, with voice-codes for family members and healthcare providers in addition to those for the patient. With multiple voice-codes for example, an alternate authorized user can substitute for the primary one (e.g. a pre-authorized healthcare provider can substitute for the patient). Multiple voice-codes (and preferably in combination with multiple passcodes) can also be used in applications benefiting from the presence of both or two different parties (e.g. both a patient and a caregiver) have to be authenticated within a short period of time of each other.

Users (e.g. patients), upon whose participation, compliance and actions desired outcomes depend, can be incentivized according to actual their actions or outcomes (performance or outcome-based systems) with financial payments, credits, rebates, waivers or refunds of deductibles, insurance premiums and the like.

Deviations from prescribed actions can be identified and associated with specific users and corresponding actions (or lack thereof) or other events related to user (e.g. patient) behavior.

Note that a "prescription" is an example of a set of rules set in the intelligent device. In the case of a prescription, the events are related to time. More generally, those rules are typically conditional on local events. The local events being related to changes in internal or external conditions to the intelligent device. E.g., environmental conditions, elapsed time (or actual time), user actions (e.g. I/O), changes in location, custody etc.

Outcomes that benefit or depend on authenticating and authorizing users (and thus their proximity to a good) can be strengthened with the use of voiceprint activated electro-mechanical locking mechanism and touch sensors. It is more likely for example, that a patient/user was actually present holding/opening/closing the pill bottle (and thus more likely to complying with the prescription) if the intelligent device/bottle was touched consistent with the prescription (and correlated with successful authentication and/or authorization of the user). As noted before neither authentication nor authorization depends on user identifiable data.

The authentication and authorization systems and methods described herein may be strengthened with audible and inaudible acoustic watermarks generated and locally propagated concurrent with presentation of passcode.

Authentication and authorization systems and methods comprising intelligent devices can be optimized/fit-for-purpose in a variety of ways. An intelligent device can evaluate voiceprints of what was spoken in context of the action taken. For example: evaluate a voiceprint as "left" instead of "lift" depending on the context (e.g. the good, the user or location). An intelligent device can verify the proximity of person (audible input) relative to action taken (using for example sensing such as Bluetooth proximity). An intelligent device can determine the number of respondents relative to action taken. For example, a loading dock with multiple workers and the handling of a good or delivery vehicle. An intelligent device can match conditions (time, temperature, motion, . . . ) to audible input(s) and action(s) taken.

The authentication or authorization systems and methods described herein can be used to authorize access to or use of physical or digital assets, based on voice, proximity of a user to an intelligent device and associate good, or a secure input (by an authenticated or authorized user). Other uses include providing/authorizing rights based on predetermined series of audible inputs (from the same or a plurality of different users), e.g. security guard making his rounds or shipper (delivery) and customer (acceptance); limit rights by detecting attempts at (or actual) unauthorized use/access by via voice input, or limit presented audible or visual information based on voices detected in a room.

Voice-codes, voiceprints or voice-profiles can be secured as any type of digital object. Among the different security methods and processes are:

Encrypting the digital objects; breaking them into pieces and storing in a distributed system, then reassembling when/where and by what device as needed Converting the voiceprint data to a token or secure code that references the voiceprint; adding a watermark to voiceprint. This is an extension of audio watermarking which is used to identify if part or all of a voiceprint (or other audio) has been stolen or inappropriately reused.

Adding a time-bomb to voiceprint so it becomes unusable after a set time, or time or event-based auto-erase ("forgetting") processes Utilizing hardware IDs of intelligent devices to associate voiceprints with single device or group of devices.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed, is:

1. An intelligent device comprising,
a processor, a memory and a clock/timer;
a power source;
a passcode and a voice-code stored in the memory, the voice-code indicative of the passcode;
an event manager;
a user message medium;
an audio input transducer;
voiceprint circuitry, and
evaluation circuitry;
wherein the processor performs the steps of:
capturing, using the audio input transducer, a user vocalized passcode;
generating, using the voiceprint circuitry, a voiceprint of the captured passcode;
evaluating the voiceprint and the voice code; and
authenticating or authorizing a user.

2. The intelligent device according to claim 1, wherein the voice-code is either a native voice-code or a synthetic voice-code.

3. The intelligent device according to claim 1, wherein the user message medium is a visual message medium, an acoustic message medium, or a haptic message medium.

4. The intelligent device according to claim 3, wherein the visual message medium is polymodal.

5. The intelligent device according to claim 1, further including communication circuitry.

6. The intelligent device according to claim 5, wherein the results of the evaluation step performed by the processor are transmitted.

7. The intelligent device of according to claim 5, wherein responsive to the evaluation step performed by the processor an alert or alarm or a message is transmitted.

8. The intelligent device of claim 1, further including sensors and the event manager further performs the step of detecting an event.

9. The intelligent device according to claim 8, wherein the sensor is a temperature sensor, a shock sensor, a vibration sensor, a motion sensor, a pressure sensor, a strain sensor, a chemical sensor, a radiation sensor, a humidity sensor, an acoustic sensor, or a light sensor.

10. The intelligent device according to claim 1, further including location circuitry.

11. The intelligent device according to claim 10, wherein the evaluation circuitry acts responsive to the location circuitry.

12. The intelligent device according to claim 1, further including verification circuitry.

13. The intelligent device according to claim 12, wherein the verification circuitry is visual verification circuitry, acoustic verification circuitry or wireless verification circuitry.

14. The intelligent device according to claim 13, wherein the evaluation circuitry acts responsive to the verification circuitry.

15. The intelligent device according to claim 1, wherein the intelligent device is a hardware agent.

16. The intelligent device according to claim 15, wherein the evaluation circuitry acts responsive to stored instructions for each of a plurality of stakeholders, and the processor further performs the step of enforcing rights for all of the stakeholders according to the stored instructions.

17. The intelligent device of according to claim 1, wherein the processor effectuates actions in response to the evaluation step.

18. The intelligent device according to claim 17, wherein the actions performed by the processor include storing or presenting the results of the evaluation.

19. The intelligent device according to claim 17, wherein the actions performed by the processor include generating an alarm or alert signal, communicating a message, or modifying a message presented by a message medium of the intelligent device.

20. The intelligent device according to claim 17, wherein the actions performed by the processor include generating or erasing passcodes or voice-codes.

21. The intelligent device according to claim 17, wherein the actions performed by the processor include granting permissions in response to the evaluation.

22. The intelligent device according to claim 17, wherein the actions performed by the processor include storing information related to the user, location or good.

23. The intelligent device of according to claim 1, further including a plurality of passcodes or a plurality of voice-codes.

24. An intelligent device comprising,
a processor, a memory and a clock/timer; a power source; an event manager;
a passcode and a voice-code, the voice-code related to the passcode; communication circuitry; evaluation circuitry; and
wherein the communication circuitry receives a voiceprint, and the processor performs the steps of evaluating the voiceprint with the stored voice-code and authenticating or authorizing a user.

25. The intelligent device according to claim 24, wherein the voice-code is either a native voice-code or a synthetic voice-code.

26. The intelligent device of claim 24, further including sensors.

27. The intelligent device according to claim 26, wherein the sensor is a temperature sensor, a shock sensor, a vibration sensor, a motion sensor, a pressure sensor, a strain sensor, a chemical sensor, a radiation sensor, a humidity sensor, an acoustic sensor, or a light sensor.

28. The intelligent device according to claim 24, further including location circuitry.

29. The intelligent device according to claim 28, wherein the evaluation circuitry acts responsive to the location circuitry.

30. The intelligent device according to claim 24, further comprising a visual user message medium, an acoustic message medium or a haptic user message medium.

31. The intelligent device according to claim 30 wherein the visual user message medium is polymodal.

32. The intelligent device according to claim 30, further including verification circuitry.

33. The intelligent device according to claim 32, wherein the evaluation circuitry acts responsive to the verification circuitry.

34. The intelligent device of according to claim 30, wherein the processor performs the further step of modifying or presenting a message in response to the evaluation.

35. The intelligent device according to claim 24, wherein the intelligent device is a hardware agent.

36. The intelligent device according to claim 35, wherein the evaluation circuitry is responsive to the stored instructions for each of a plurality of stakeholders, and the processor further performs the step of enforcing rights for all of the stakeholders according to the stored instructions.

37. The intelligent device of according to claim 24, wherein the processor effectuates actions in response to the evaluation step.

38. The intelligent device according to claim 37, wherein the actions performed by the processor include storing or transmitting the results of the evaluation.

39. The intelligent device according to claim 38, wherein the actions performed by the processor include transmitting an alarm or alert signal, or a message.

40. The intelligent device according to claim 37, wherein the actions performed by the processor include granting permissions in response to the evaluation.

41. The intelligent device according to claim 37, wherein the actions performed by the processor include storing information related to the user, location or good.

42. The intelligent device according to claim 37, wherein the actions performed by the processor include generating or erasing passcodes or voice-codes.

43. The intelligent device of according to claim 24, further including a plurality of passcodes or a plurality of voice-codes.

* * * * *